US008145821B2

(12) United States Patent
Mead et al.

(10) Patent No.: US 8,145,821 B2
(45) Date of Patent: Mar. 27, 2012

(54) DOCKING STATION FOR PORTABLE ELECTRONIC DEVICES

(75) Inventors: Stephen Mead, Bradenton, FL (US);
Kenneth Fair, Bradenton, FL (US);
Jeremy Thomas, Maricopa, AZ (US)

(73) Assignee: Honeywell International Inc., Morristown, NJ (US)

( * ) Notice: Subject to any disclaimer, the term of this patent is extended or adjusted under 35 U.S.C. 154(b) by 95 days.

(21) Appl. No.: 12/403,088

(22) Filed: Mar. 12, 2009

(65) Prior Publication Data

US 2009/0292851 A1    Nov. 26, 2009

Related U.S. Application Data

(60) Provisional application No. 61/054,767, filed on May 20, 2008.

(51) Int. Cl.
*G06F 13/00* (2006.01)
*G06F 1/16* (2006.01)

(52) U.S. Cl. .................. 710/303; 710/304; 361/679.41; 361/679.55; 361/679.56

(58) Field of Classification Search .................. 710/303, 710/304; 361/679.41, 679.55, 679, 56
See application file for complete search history.

(56) References Cited

U.S. PATENT DOCUMENTS

| | | | | |
|---|---|---|---|---|
| 5,316,369 A | * | 5/1994 | Kanda | 297/188.15 |
| 5,374,104 A | * | 12/1994 | Moore et al. | 297/188.16 |
| 5,644,471 A | | 7/1997 | Schultz et al. | |
| 6,042,414 A | | 3/2000 | Kunert | |
| 6,053,759 A | | 4/2000 | Kunert | |
| 6,062,518 A | | 5/2000 | Etue | |
| 6,189,755 B1 | | 2/2001 | Wakefield | |
| 6,253,982 B1 | | 7/2001 | Gerardi | |
| 6,480,378 B2 | | 11/2002 | Chang | |

(Continued)

FOREIGN PATENT DOCUMENTS

EP    1726918    11/2006

(Continued)

OTHER PUBLICATIONS

"Rockwell Collins introduces iPod integration solutions; Dassult Falcon to be launch customer"—4 pages, Dated Sep. 24, 2007.*

(Continued)

*Primary Examiner* — Brian Misiura
(74) *Attorney, Agent, or Firm* — Ingrassia Fisher & Lorenz, P.C.

(57) ABSTRACT

A docking station apparatus interfaces a portable electronic device with one or more electrical systems of a vehicle. The apparatus includes a docking assembly having an internal cavity and configured to hold the electronic device, and a mechanical interface in the cavity and configured to provide a wired or wireless connection to the electronic device. A power supply conversion circuit translates vehicle power levels to electronic device power levels, and one or more support circuits or connectors provide different connectivity functions for the electronic device. The support circuits or connectors can include input audio/video connectors in the docking assembly to provide analog audio/video signals to an analog distribution hub; an audio/video encoder and digital data connectors to provide digitally encoded audio/video signals in a wired or wireless mode to a digital distribution hub; multiplexing circuitry to accept analog audio, composite video, or component video for multiplexing between externally supplied audio/video and locally generated audio/video; and a command and control circuit to provide command and control data, and navigation data, to the electronic device in a wired or wireless mode.

15 Claims, 13 Drawing Sheets

U.S. PATENT DOCUMENTS

| | | | |
|---|---|---|---|
| 6,539,358 B1 | 3/2003 | Coon et al. | |
| 6,591,085 B1 | 7/2003 | Grady | |
| 6,633,482 B2 | 10/2003 | Rode | |
| 6,661,353 B1 * | 12/2003 | Gopen | 340/973 |
| 6,778,813 B1 | 8/2004 | Lilly | |
| 6,788,528 B2 | 9/2004 | Enners et al. | |
| 6,835,068 B2 * | 12/2004 | Pappas et al. | 439/34 |
| 6,863,344 B2 * | 3/2005 | Smallhorn | 297/217.3 |
| 7,047,039 B2 | 5/2006 | Lalley | |
| 7,099,466 B2 | 8/2006 | Walsh | |
| 7,099,467 B1 | 8/2006 | Rohrbach | |
| 7,140,586 B2 | 11/2006 | Seil et al. | |
| 7,200,357 B2 | 4/2007 | Janik et al. | |
| 7,236,863 B2 | 6/2007 | LaPorte et al. | |
| 7,269,002 B1 | 9/2007 | Turner et al. | |
| 7,280,802 B2 | 10/2007 | Grady | |
| 7,292,881 B2 | 11/2007 | Seil et al. | |
| 7,381,095 B2 * | 6/2008 | Freeman et al. | 439/638 |
| 7,413,155 B2 | 8/2008 | Seil et al. | |
| 7,570,918 B2 * | 8/2009 | Chen | 455/41.3 |
| D600,680 S * | 9/2009 | Mead et al. | D14/217 |
| 7,609,946 B2 * | 10/2009 | Schedivy | 386/125 |
| 7,611,114 B1 * | 11/2009 | Griffin | 248/311.2 |
| 2004/0086112 A1 | 5/2004 | Hilger et al. | |
| 2004/0228622 A1 | 11/2004 | Schedivy | |
| 2005/0014536 A1 | 1/2005 | Grady | |
| 2006/0105819 A1 | 5/2006 | Liao | |
| 2006/0107295 A1 | 5/2006 | Margis et al. | |
| 2006/0127034 A1 * | 6/2006 | Brooking et al. | 386/46 |
| 2006/0134959 A1 | 6/2006 | Ellenbogen | |
| 2006/0181840 A1 | 8/2006 | Cvetko | |
| 2006/0238971 A1 | 10/2006 | Compton | |
| 2006/0243772 A1 | 11/2006 | Sirichai et al. | |
| 2006/0258440 A1 * | 11/2006 | Vitito | 463/29 |
| 2006/0258441 A1 * | 11/2006 | Vitito | 463/29 |
| 2006/0280045 A1 * | 12/2006 | Ritsher et al. | 369/30.01 |
| 2006/0288377 A1 * | 12/2006 | Hsieh | 725/76 |
| 2007/0038434 A1 | 2/2007 | Cvetko | |
| 2007/0077998 A1 * | 4/2007 | Petrisor | 463/42 |
| 2007/0087725 A1 | 4/2007 | Anderson | |
| 2007/0114974 A1 | 5/2007 | Grady | |
| 2007/0155440 A1 | 7/2007 | Everett et al. | |
| 2007/0281619 A1 | 12/2007 | Chen | |
| 2008/0019082 A1 | 1/2008 | Krieger et al. | |
| 2008/0021636 A1 * | 1/2008 | Stavaeus et al. | 701/207 |
| 2008/0023600 A1 * | 1/2008 | Perlman | 248/128 |
| 2008/0033610 A1 | 2/2008 | Engel | |
| 2008/0089658 A1 * | 4/2008 | Grady et al. | 386/46 |
| 2008/0100474 A1 * | 5/2008 | Briski et al. | 340/945 |
| 2008/0104642 A1 * | 5/2008 | Galipeau et al. | 725/76 |
| 2008/0130912 A1 | 6/2008 | Marlowe | |
| 2008/0138028 A1 | 6/2008 | Grady et al. | |
| 2008/0140240 A1 | 6/2008 | White et al. | |
| 2009/0079705 A1 * | 3/2009 | Sizelove et al. | 345/173 |
| 2009/0083805 A1 * | 3/2009 | Sizelove et al. | 725/76 |
| 2009/0119721 A1 * | 5/2009 | Perlman et al. | 725/76 |
| 2010/0078536 A1 * | 4/2010 | Galvin | 248/231.51 |
| 2010/0134984 A1 * | 6/2010 | Lum et al. | 361/725 |
| 2010/0138581 A1 * | 6/2010 | Bird et al. | 710/303 |
| 2010/0138582 A1 * | 6/2010 | Bird et al. | 710/303 |

FOREIGN PATENT DOCUMENTS

EP      2124129 A2 *  11/2009

OTHER PUBLICATIONS

"Apple Teams Up With Air France, Continental, Delta, Emirates, KLM & United to Deliver iPod Integration"—2 pages, Dated Nov. 14, 2006.*

"Cabin Systems Marketing Bulletin—iPod Solutions"—Ref. No. BRS-110099M; Pub. Date Jan. 2011; 5 pages.*

"MacAlly Black iPod Cup Holder Docking Station", "http://www.Amazon.com", accessed Sep. 17, 2008, Publisher: MacAlly.

Rosenberg, Barry, "Inflight Entertainment", "http://www.aviationtoday.com", Aug. 1, 2008, Publisher: Avionics Magazine.

"niceTM Successfully Launched on Bombardier Challenger 200 Jet", "http://www.lufthansa-technik.com", Sep. 26, 2007, Publisher: Lufthansa Technik AG.

* cited by examiner

DOCKING STATION FOR PORTABLE ELECTRONIC DEVICES

CROSS-REFERENCE TO RELATED APPLICATION

The present application claims the benefit of priority to U.S. Provisional Application Ser. No. 61/054,767, filed on May 20, 2008, which is incorporated herein by reference.

BACKGROUND

Portable electronic devices are ever increasing in popularity such as for personal entertainment. Such electronic devices are used in a variety of different environments, such as during travel in automobiles or airplanes. While there are many places a person in a traveling vehicle can place a portable electronic device, such as in a pocket of clothing, on a seat, on the floor, on the dashboard, etc., none of these places offer the stability, security, easy access, and visibility that is desirable.

Various electronic device holders have been developed such as for use in a vehicle cup holder during travel. These holders typically require power cables or other connecting cables to be used with the portable electronic device. Such cables extend from the electronic device outside of the holder in an unsightly manner for connection to an electrical system of the vehicle. These cables can be lengthy and in the way such that passengers can get entangled.

Accordingly, there is a need for an apparatus for holding a portable electronic device in a suitable position while traveling in an automobile or airplane that overcomes the foregoing deficiencies.

SUMMARY

The present invention is related to a docking station apparatus for interfacing a portable electronic device with one or more electrical systems of a vehicle. The apparatus includes a docking assembly having an internal cavity and configured to hold the portable electronic device, and a mechanical interface in the cavity of the docking assembly and configured to provide a wired or wireless connection to the portable electronic device. A power supply conversion circuit translates vehicle power levels to portable electronic device power levels, and one or more support circuits or connectors provide different connectivity functions for the portable electronic device. The support circuits or connectors can include input audio/video connectors in the docking assembly to provide analog audio/video signals to an analog distribution hub; an audio/video encoder and digital data connectors to provide digitally encoded audio/video signals in a wired or wireless mode to a digital distribution hub; multiplexing circuitry to accept analog audio, composite video, or component video for multiplexing between externally supplied audio/video and locally generated audio/video; and a command and control circuit to provide command and control data, and navigation data, to the portable electronic device in a wired or wireless mode.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
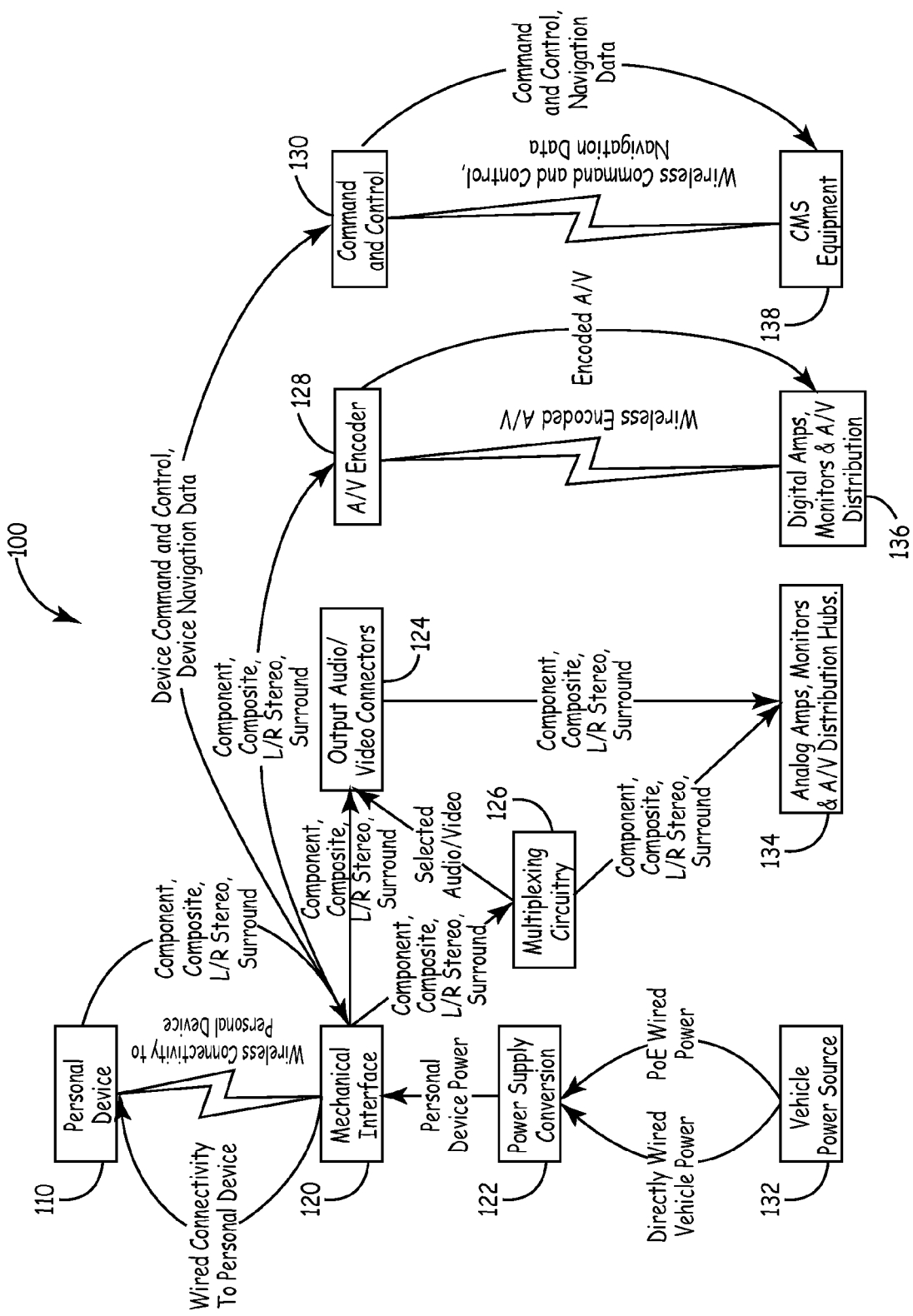
FIG. 1 is a block diagram of various wired and wireless connection implementations for a docking station of the present invention.

In the following detailed description, embodiments are described in sufficient detail to enable those skilled in the art to practice the invention. It is to be understood that other embodiments may be utilized without departing from the scope of the present invention. The following description is, therefore, not to be taken in a limiting sense.

The present invention is directed to a docking station for holding and interfacing personal portable electronic devices with one or more electrical systems of a vehicle. The docking station provides supporting electronic circuitry to enable a variety of connectivity options for a portable electronic device.

In one embodiment, the docking station is configured to be an insert for a drink cup holder adjacent to an automobile or aircraft seat. In another embodiment, the docking station is configured to be part of an armrest seat, or a table or trim assembly (such as an aircraft drink rail). The docking station can also be retrofitted into existing aircraft seat structures without cutting any new holes.

The docking station can provide connections for a variety of portable device types. For example, the docking station can support a number of commercially available portable wired or wireless electronic devices, such as portable media players (e.g., iPod players, Zune players, and the like), cellular phones, USB drives, video game players, karaoke equipment, as well as other audio and video sources. If a wired portable device is used, the docking station can support a commercially available connector. The docking station also supports native device connectors such as a 30-pin iPod connector.

The docking station, as depicted in the implementations of FIGS. 2-9 discussed below, has the ability to support a portable device in alternate rotations, such as a portrait mode (upright position) or a landscape mode (e.g., turning an iPod or iPhone on its side to show movies). The docking station can be swiveled to rotate a display and controls of a portable device for the best angle. The docking station is easily removable from a cup holder, to support other powered cup holder options such as a monitor arm, or so that the cup holder can be used to support a drinking cup.

In one implementation, the docking station can connect the portable electronic device to an in-flight entertainment (IFE) system of an aircraft in a wired or wireless manner, to transport audio, video and/or transport control signals, and supports either an analog IFE or a digital IFE system. If a digital IFE system is available for use, the docking station can support alternative power strategies like Power over Ethernet. The docking station can provide the capability for interconnection with IFE command and control systems to support remotely controlling the portable device with other IFE control devices. The docking station can also provide the capability to control the IFE system, with a connected portable device running software that will facilitate that control. The docking station supports digital and/or analog connections to an IFE distribution system or local displays and speakers. If the IFE or other display or audio equipment require encoded digital signals, encode circuitry can be implemented in the docking station or cup holder docking interface.

The docking station provides a mechanical interface, such as a printed circuit board, which interfaces the portable electronic device to vehicle electrical systems such as the aircraft IFE system and/or aircraft power. The docking station also supports power and wired or wireless connectivity from the interface to the vehicle. The docking station can be implemented with various standard media connectors, such as component video (e.g., RCA connectors), composite video (e.g., RCA connectors), stereo and surround (e.g., RCA connectors), High-Definition Multimedia Interface (HDMI), headphone jacks, 3.5 mm auxiliary-in jacks, USB ports, and optical fiber. Additionally, the docking station supports the ability to transmit media via wireless standards including, but not limited to, Bluetooth and 802.11x standards such as 802.11N.

The docking station provides integrated power supply conversion such as from typical aircraft power (28 VDC) to power supported by a portable electronic device. For example, the docking station can be powered by existing wiring run into drink cup holders on aircraft for other purposes, such as for powering display monitors.

The docking station of the invention is described in further detail as follows with respect to the drawings.

FIG. 1 is a block diagram showing various electrical connection implementations for a docking station 100 of the invention. It should be understood that one or more of these implementations can be employed in a docking station in various combinations, or all of the implementations can be employed in a docking station.

As shown in FIG. 1, a personal electronic device 110 has a wired or wireless connection to a mechanical interface 120 in the docking station 100. The electronic device can provide video (component, composite) signals and/or audio (stereo, surround) signals, as well as control and data signals, to mechanical interface 120. Various circuitry can be employed to wirelessly integrate docking station 100 to personal device 110. For example, such circuitry can be housed in an internal cavity of docking station 100 or in an external support box.

The cavity and/or external support box of docking station 100 may contain power supply conversion circuitry 122 to translate vehicle power (e.g., 28 VDC for most aircraft) to personal device power levels (e.g., 12 VDC), to support power requirements and charging. Vehicle power may be supplied directly or via integrated wiring such as Power over Ethernet (PoE) from a vehicle power source 132.

One or more support circuits or connectors can be employed by docking station 100 to provide different connectivity options for the portable electronic device. For example, the cavity and/or external support box of docking station 100 may contain circuitry and/or connectors 124 to accept analog audio (left/right stereo, surround channels), composite and/or component video, to amplifiers, monitors, and/or audio/video (A/V) distribution hubs 134.

The cavity and/or external support box may also contain circuitry and/or connectors (e.g., A/V encoder) 128 to supply digitally encoded audio and/or video (e.g., Ethernet wiring) from the docking station to digital amplifiers, monitors, and/or A/V distribution hubs 136. Circuitry and/or connectors can also be provided to wirelessly supply digitally encoded audio and/or video from the docking station to the digital amplifiers, monitors, and/or the audio/video distribution hubs 136.

Multiplexing circuitry 126 and/or connectors can also be provided to accept analog audio, composite video, and/or component video for the purpose of multiplexing between the externally supplied audio and/or video and the locally generated audio and/or video.

The cavity and/or external support box may contain command and control circuitry and/or connectors 130 (e.g., Ethernet, CAN bus, RS-232, RS-485, wireless) to support connectivity to a cabin management system (CMS—including IFE) equipment 138 such as a command and control bus, which can provide command, control, and navigation data in a wired or wireless mode.

The docking station 100 can also have various control implementations. External transport control (e.g., play, pause, fast forward, fast reverse, next, last, etc.) of the docking station and/or the personal device can be provided from control devices on a CMS bus. External display of media selection display options (e.g., album art, movie art, titles, artists, directors, actors, etc.) on the personal device can be displayed from control devices on the CMS bus. Control of CMS features from the personal device via software applications can also be provided if desired.

Figure 2A:
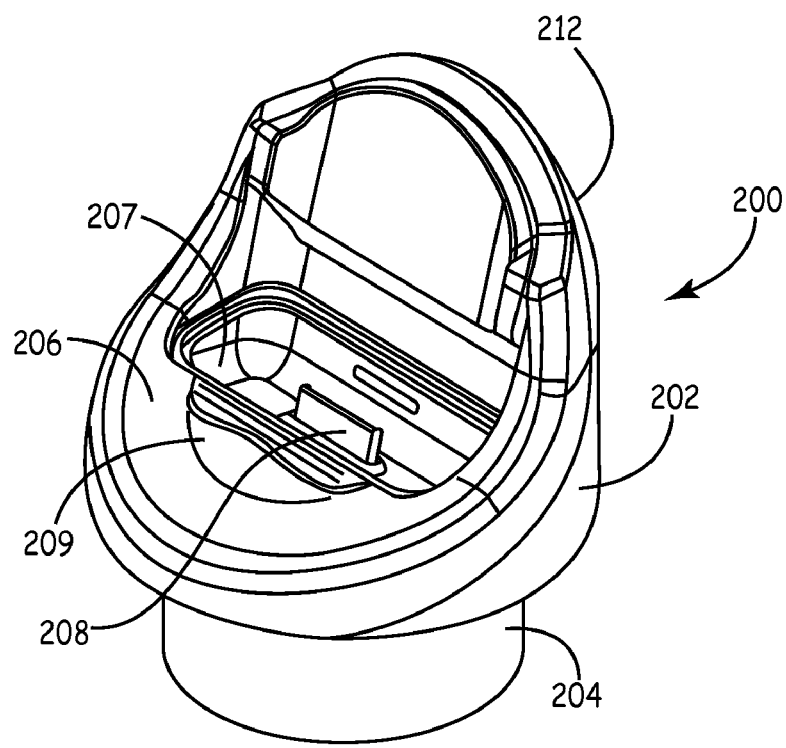
FIG. 2A is a front isometric view of a docking assembly according to one embodiment of the invention.
Figure 2B:
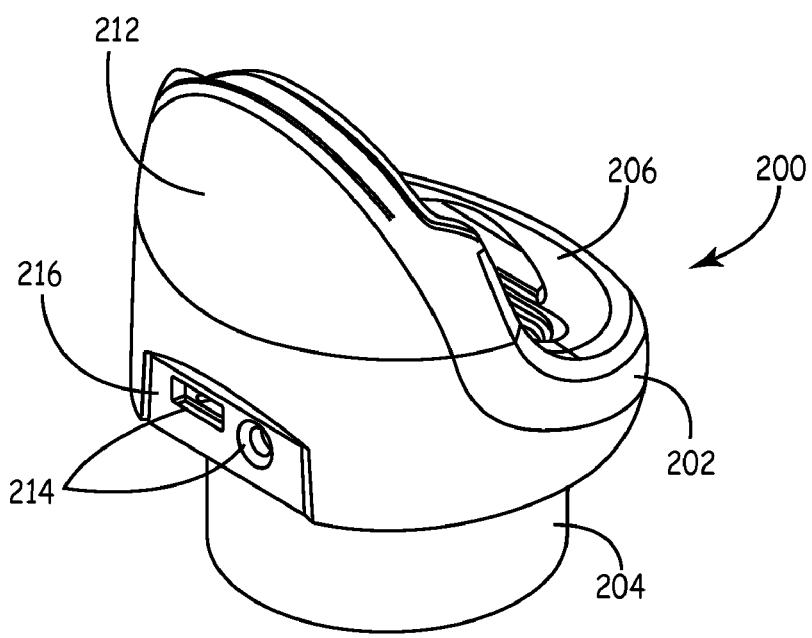
FIG. 2B is a back isometric view of the docking assembly shown in FIG. 2A.
Figure 2C:
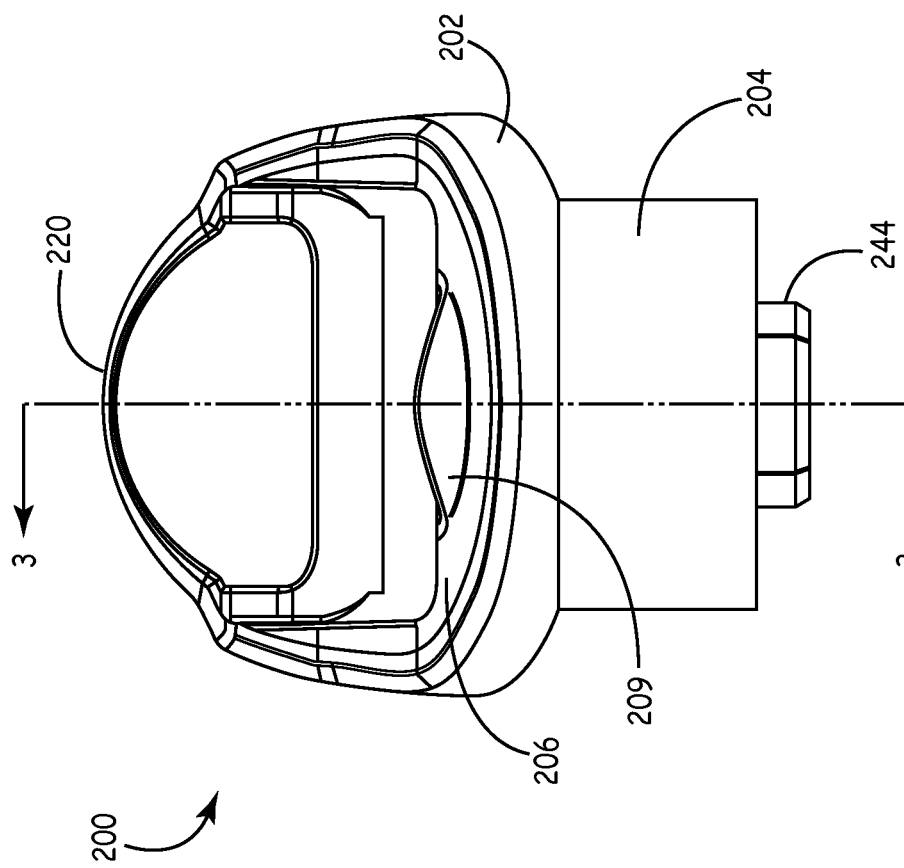
FIG. 2C is a front elevation view of the docking assembly shown in FIG. 2A.

FIGS. 2A-2C depict alternative views of a docking station according to one embodiment of the invention. The docking station includes a docking assembly 200 with a top housing section 202 and a bottom housing section 204 that has a generally cylindrical shape. This allows docking assembly 200 to fit into a vehicle cup holder, such as a drink cup holder in an aircraft, and be rotated in the cup holder to provide the best angle for viewing a portable electronic device.

The top housing section 202 has an upper surface 206 with an elongated slot 207 therein as shown in FIG. 2A. A lip portion 209 rises from upper surface 206 in front of slot 207 and provides support to the portable electronic device positioned for viewing in a landscape mode.

An electronic device connector 208 is disposed in slot 207 and is configured to couple with a portable electronic device (not shown). The docking assembly 200 can provide connectivity to dock the portable electronic device via a single plug operation, a plug operation with on/off motion, wirelessly, or via COTS (commercial off the shelf) interface wiring.

The top housing section 202 has a back portion 212 that extends upwardly from upper surface 206 and is adjacent to slot 207. The back portion 212 is contiguous with upper surface 206 and is configured to support a portable electronic device in an upwardly angled position. As shown in FIG. 2B, media connectors 214 are located in a lower rear portion 216 of top housing section 202. The media connectors can include standard jacks for connectivity to component video, composite video, stereo audio, HDMI, headphone, auxiliary input, USB, or the like.

Figure 3:
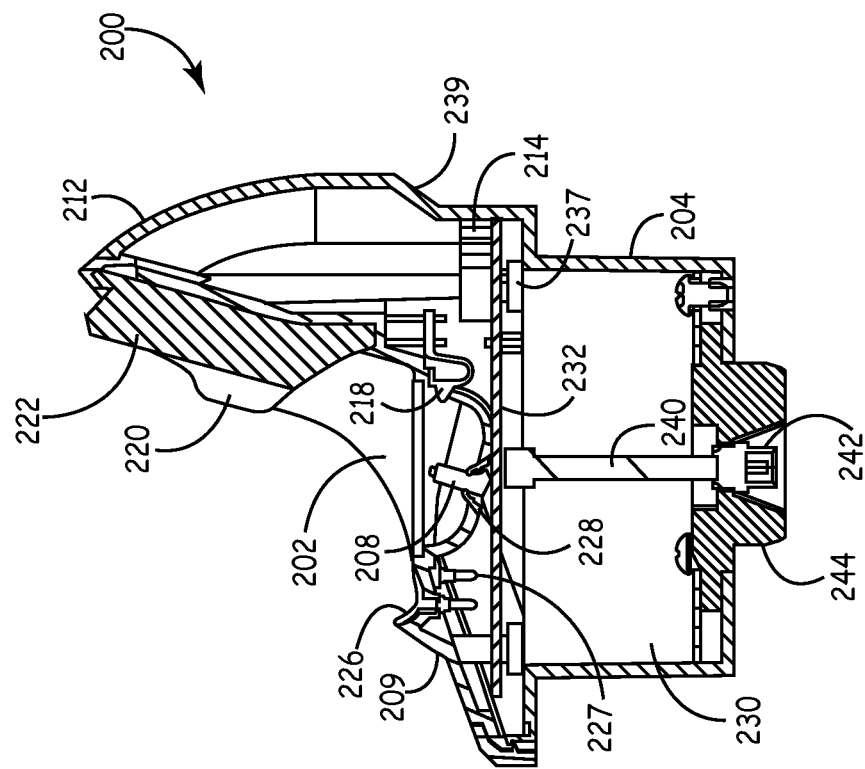
FIG. 3 is a cross-sectional view of the docking assembly as shown in FIG. 2C taken along line 3-3.
Figure 4:
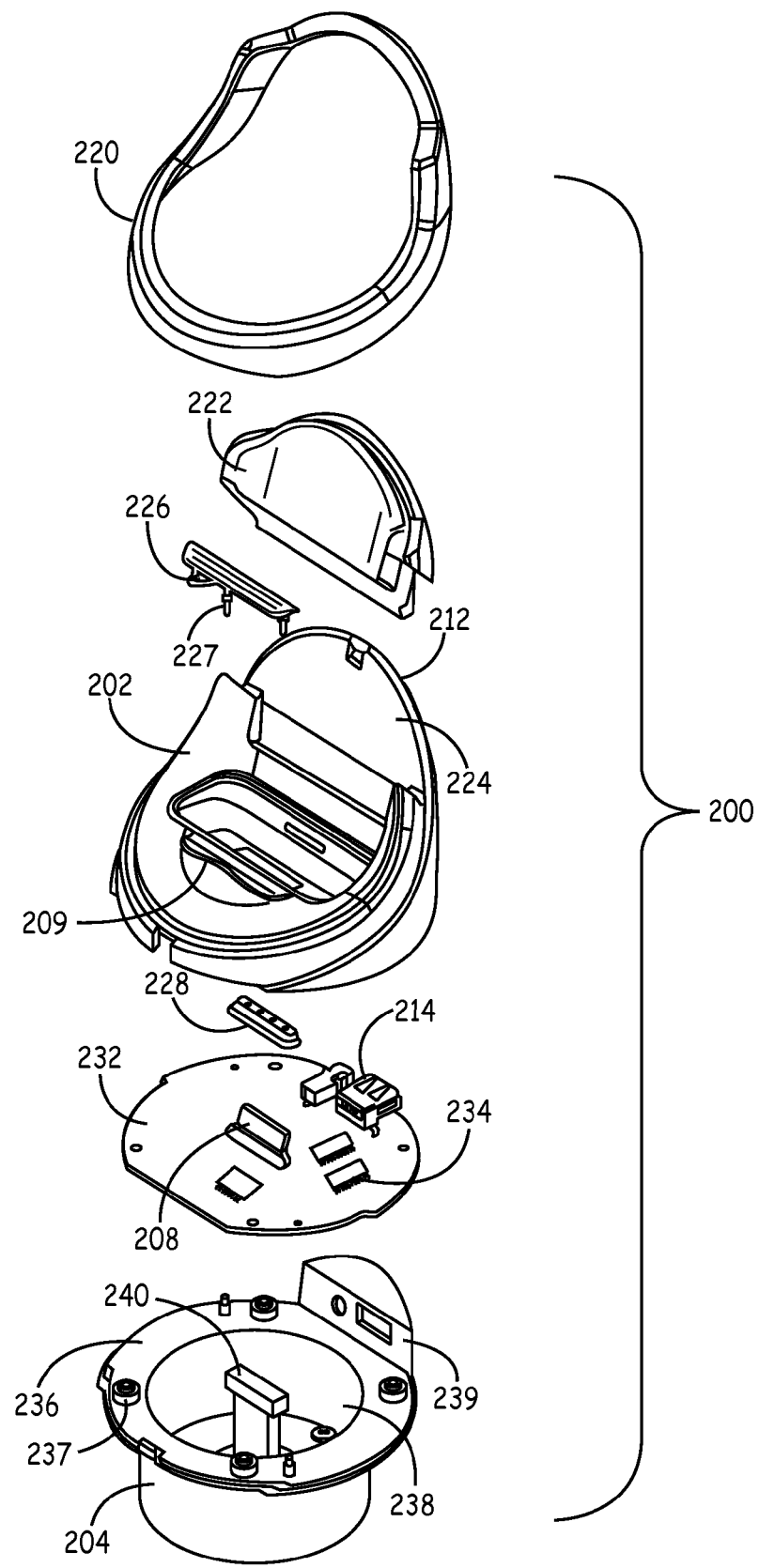
FIG. 4 is an exploded isometric view of the docking assembly shown in FIG. 2A.

Additional components of docking assembly 200 are shown more clearly in FIGS. 3 and 4. A bezel 220 is constructed to fit around the outer edges of top housing section 202. The bezel 220 encompasses and fastens other components in place including a pad 222, such as a silicon rubber pad, which is on a contact surface 224 of back portion 212. The foam pad 222 provides a cushion for a portable electronic device inserted into the docking station. A silicon pad 226 with pad plugs 227 is attached to lip portion 209 to prevent slippage of a supported portable electronic device. A connector sleeve 228 fits around electronic device connector 208 to provide support. The media connectors 214 communicate with a portable electronic device through a data connector 218 located in top housing section 202 as illustrated in FIG. 3.

The top and bottom housing sections 202 and 204 together form an internal cavity 230 as shown in FIG. 3. A mechanical interface 232, such as a printed circuit board, is disposed in cavity 230 and is configured to provide a wired or wireless connection to a portable electronic device, docking station rotation, and portrait or landscape modes for the portable electronic device. As depicted in FIG. 4, various chip packages 234 carrying integrated circuits can be mounted on mechanical interface 232 in order to provide the different connectivity and control functions described previously.

The bottom housing section 204 has a mounting flange 236 around an opening 238 in housing section 204. The flange 236 has threaded apertures 237 for receiving screws to connect the top and bottom housing sections 202 and 204 as shown in FIG. 3. The flange 236 has a raised extension 239 with openings therein for access to media connectors 214 when the top and bottom housing sections 202 and 204 are connected together. A power connector 240 is disposed in cavity 230 below mechanical interface 232. The power connector 240 is coupled to electronic device connector 208 at one end and has a power coupler 242 at the other end that extends into a plug section 244 attached to the underside of housing section 204. The plug section 244 can be made of a Delrin plastic material (polyoxymethylene), and is configured to fit into a power receptacle of a cup holder as discussed hereafter.

Figure 5:
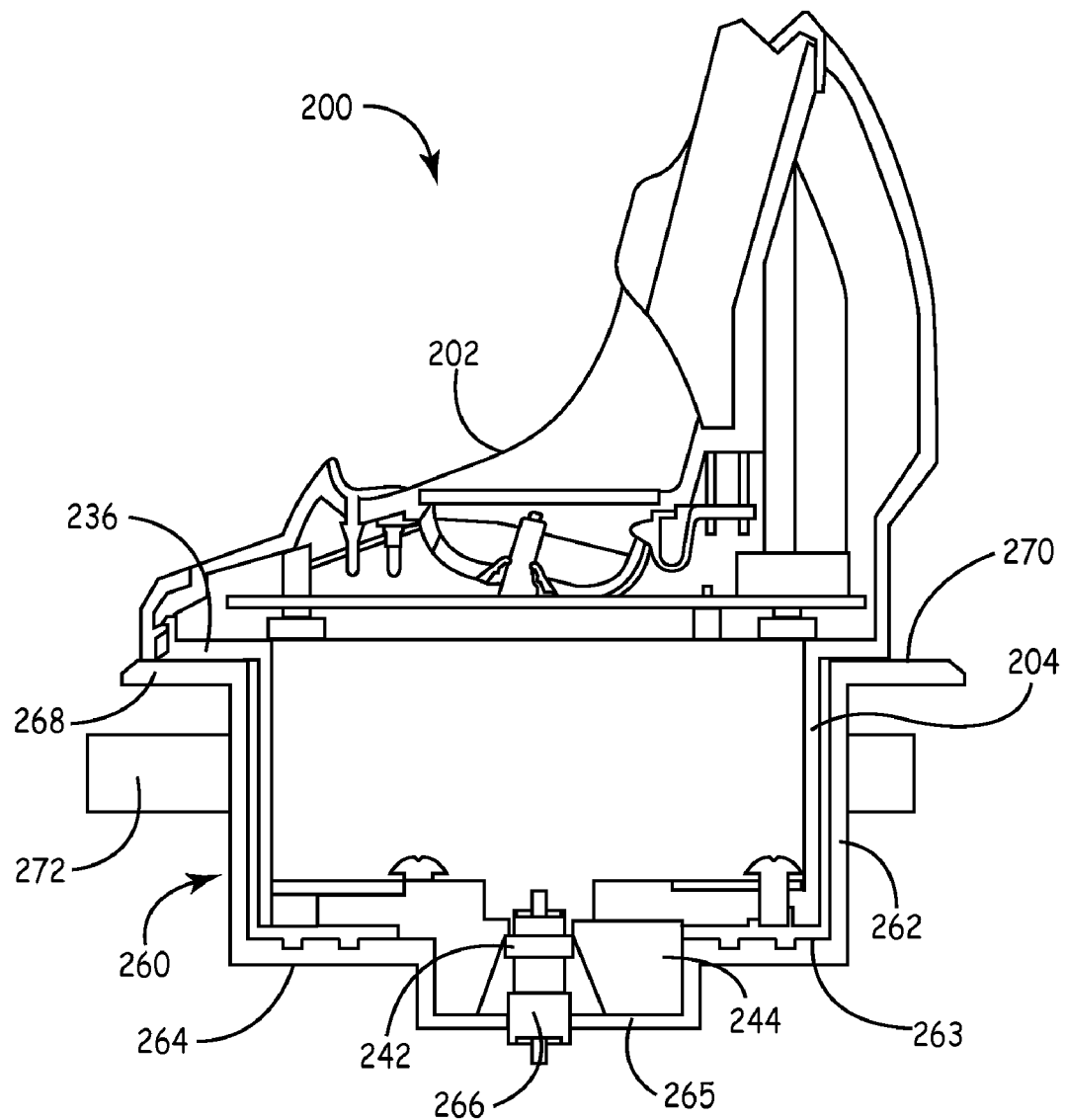
FIG. 5 is a cross-sectional view of the docking assembly as shown in FIG. 2C inserted into a holding device.

FIG. 5 depicts the docking assembly 200, as shown in FIG. 3, inserted into a corresponding holding device 260, which can be in the form of a cup holder. The holding device 260 includes an upper holding receptacle 262 that receives bottom housing section 204 of docking assembly 200. A sleeve insert 263 coupled to a bottom section 264 of holding receptacle 262 allows housing section 204 to fit snugly within holding receptacle 262. A lower power receptacle 265 receives plug section 244 when docking assembly 200 is inserted in holding device 260. A power supply coupler 266 extends into power receptacle 265 and mates with power coupler 242.

The holding device 260 also has a support flange 268 around an upper edge of holding receptacle 262. The support flange 268 has an upper surface 270 on which upper housing section 202 sits when docking assembly 200 is placed in holding device 260. A gasket, such as a felt gasket, can be placed between upper surface 270 and the bottom surface of flange 236 of bottom housing section 204. The gasket acts as a protective surface and a vibration dampener. A mounting bracket 272 can be used to secure holding device 260 in place such as in the seat structure of an aircraft. An external support box (not shown) can be implemented as part of holding device 260 or can be externally connected to holding device 260. The bottom housing section 204 can be configured to rotate within holding device 260, allowing docking assembly 200 to be rotated for an optimum viewing angle while maintaining a fixed connection.

Figure 6A:
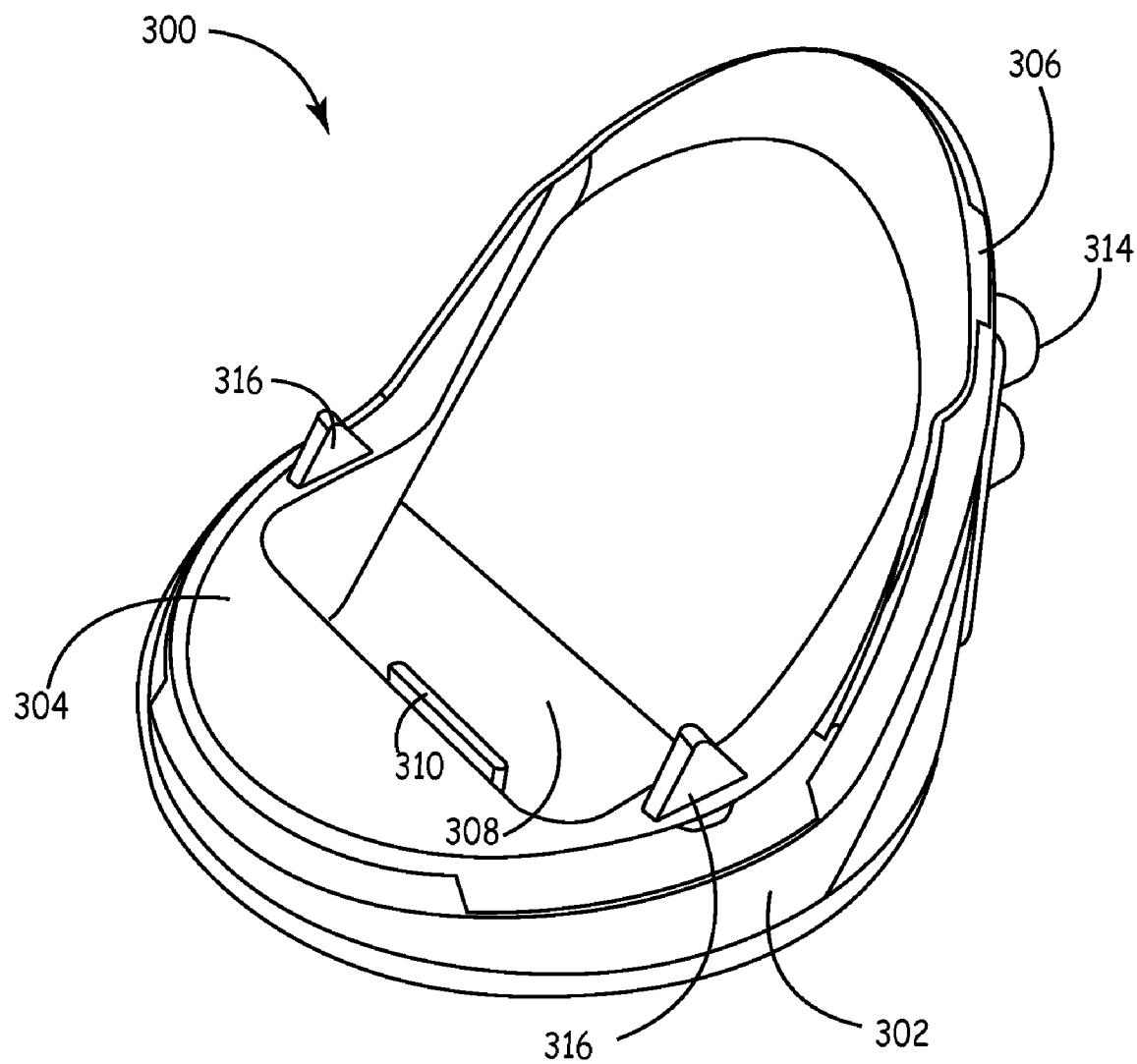
FIG. 6A is a front isometric view of an alternative configuration for a top housing section of a docking assembly.
Figure 6B:
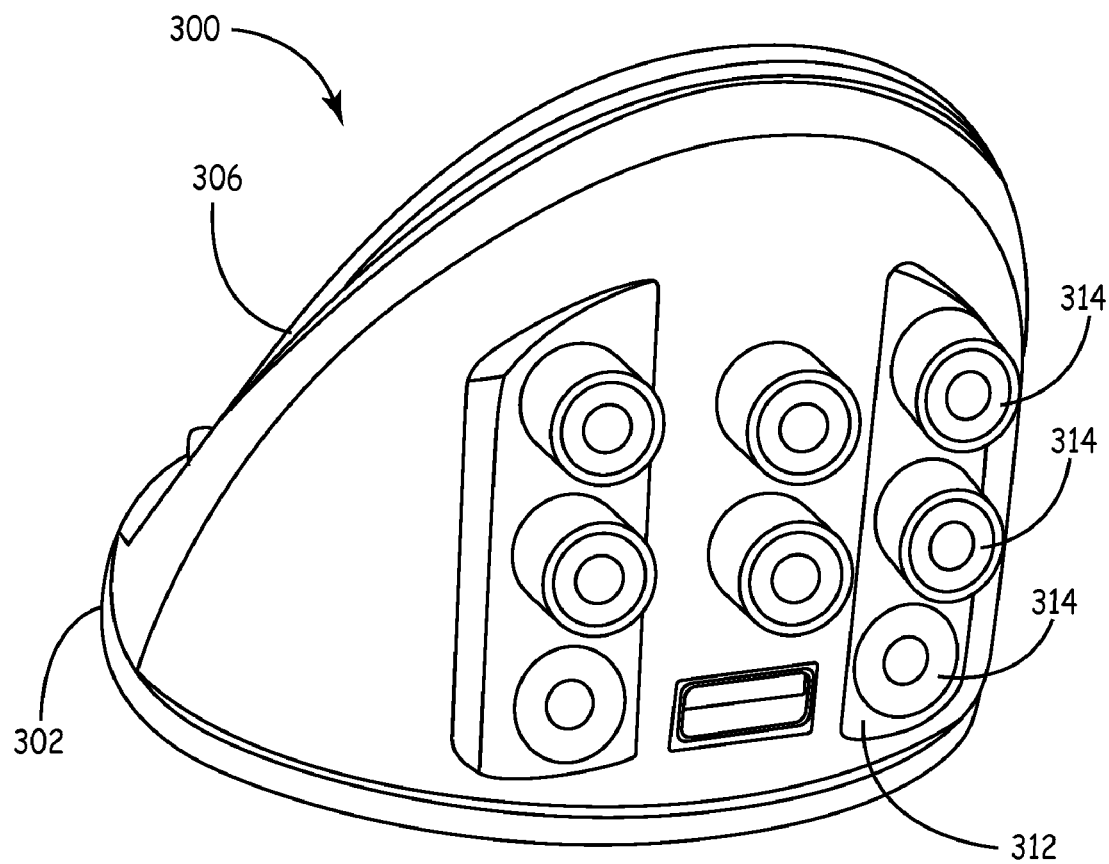
FIG. 6B is a back isometric view of the top housing section of the docking assembly shown in FIG. 6A.
Figure 6C:
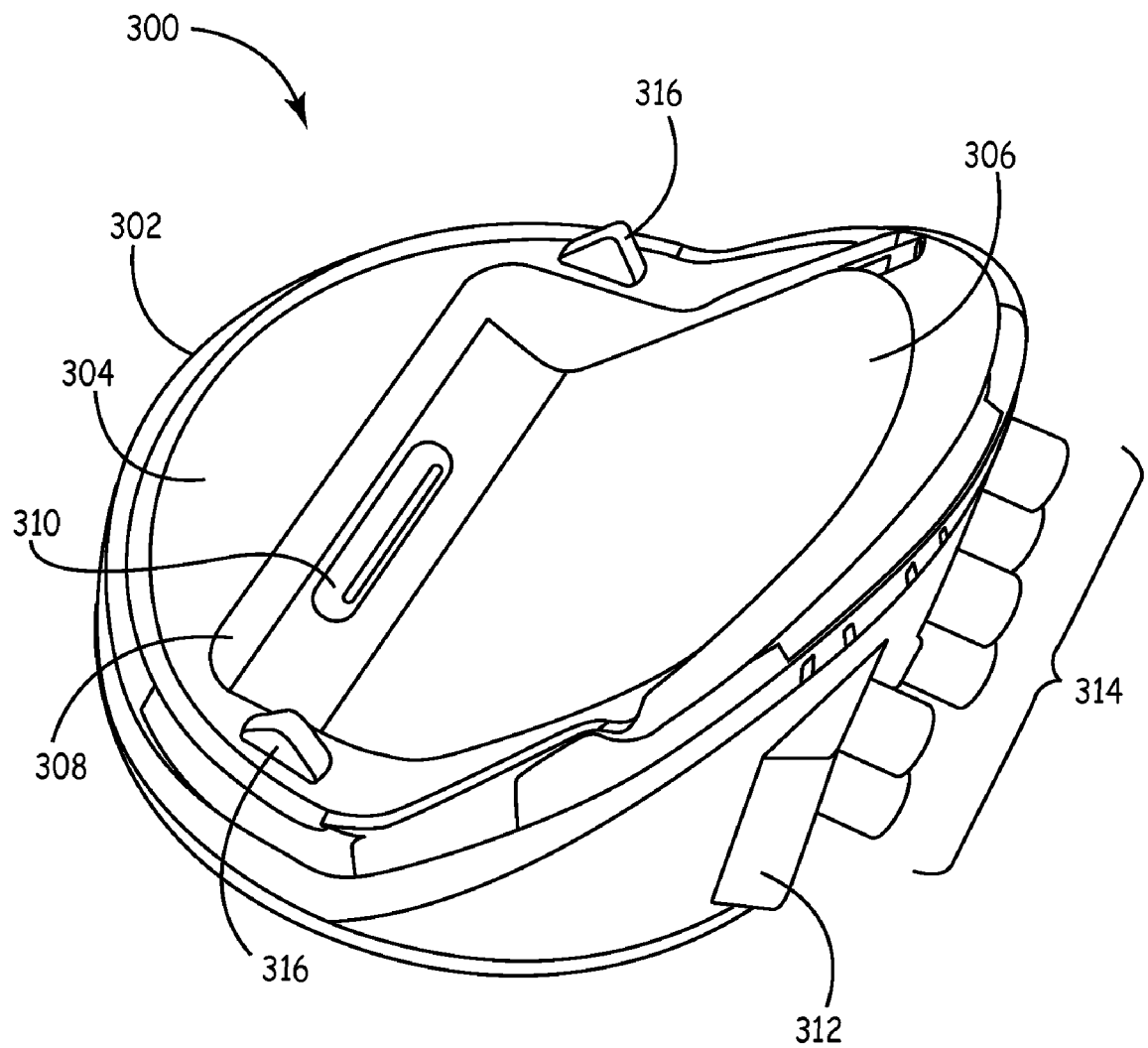
FIG. 6C is a top isometric view of the top housing section of the docking assembly shown in FIG. 6A.

FIGS. 6A-6C illustrate an alternative configuration for a top housing section of a docking assembly 300. The docking assembly 300 can have a bottom housing section and internal structures similar to that shown and described for docking assembly 200. The top housing section of docking assembly 300 has a base section 302 having an upper surface 304. A back portion 306 is contiguous with upper surface 304 and is configured to support a portable electronic device in an upwardly angled position. The upper surface 304 has a slot 308 in which an electronic device connector 310 resides. A rear portion 312 contains a plurality of media connectors 314, which can include standard jacks for connectivity to component video, composite video, stereo audio, HDMI, headphone, auxiliary input, USB, and the like.

Figure 7:
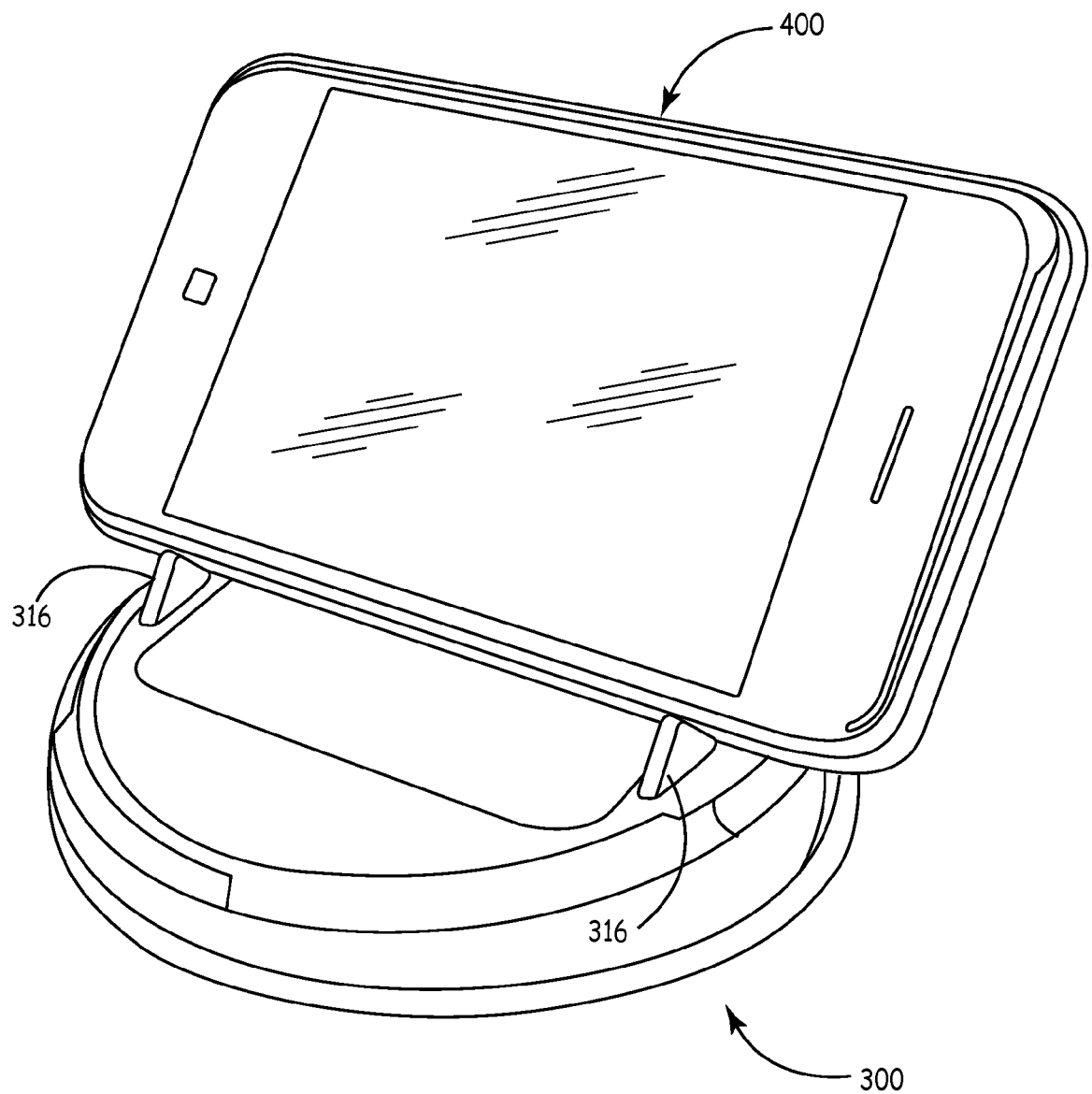
FIG. 7 is a front isometric view of the top housing section of the docking assembly shown in FIG. 6A, holding a portable electronic device in a landscape mode.
Figure 8:
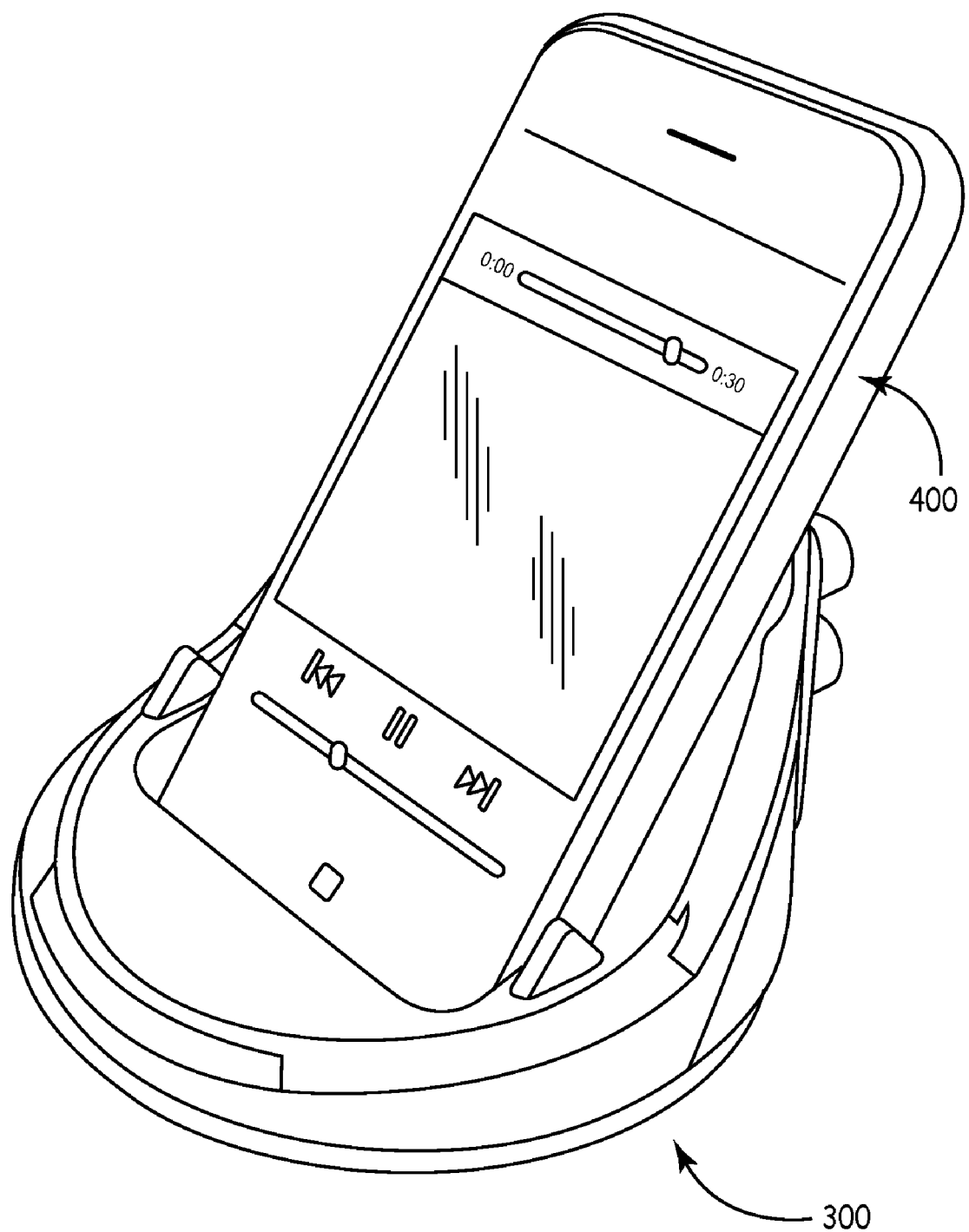
FIG. 8 is a front isometric view of the top housing section of the docking assembly shown in FIG. 6A, holding a portable electronic device in a portrait mode.

A pair of opposing support tabs 316 is located on upper surface 304 adjacent to opposite ends of slot 308. As shown in FIG. 7, support tabs 316 are configured to support a portable electronic device 400 in a landscape mode. The docking assembly 300 can also support portable electronic device 400 in a portrait mode as shown in FIG. 8.

The docking assembly 300 provides connectivity to dock portable electronic device 400 via a single plug operation, wirelessly, or via COTS interface wiring. A cavity within the docking assembly 300 and/or an external support box can be used to house supporting circuitry. The supporting circuitry can also be mounted below a cup holder as part of the structural support of the cup holder.

Figure 9:
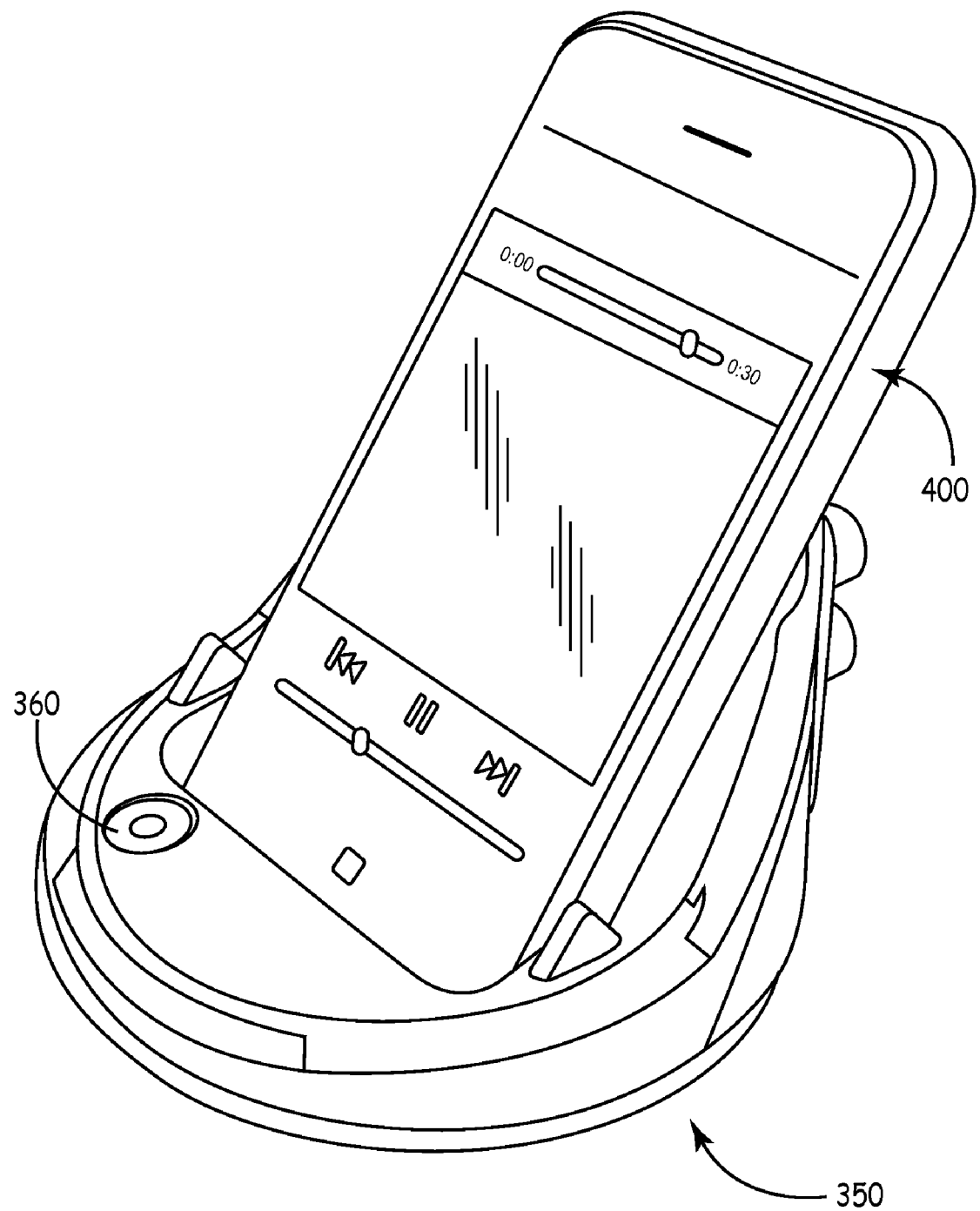
FIG. 9 is a front isometric view of an alternative configuration of a top housing section of a docking assembly, holding a portable electronic device in a portrait mode.
Figure 10A:
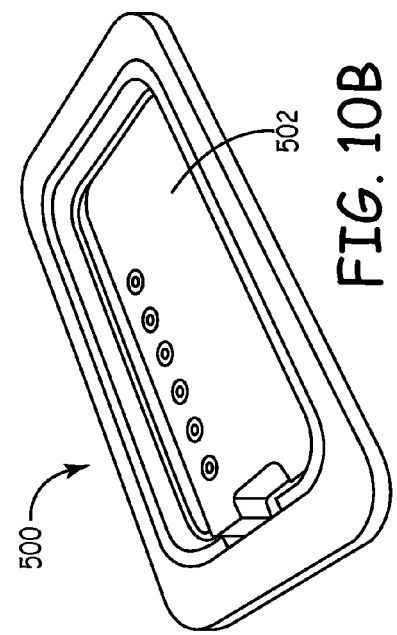
FIGS. 10A-10D are elevated perspective views of a docking station according to a further embodiment of the invention.
Figure 10B:
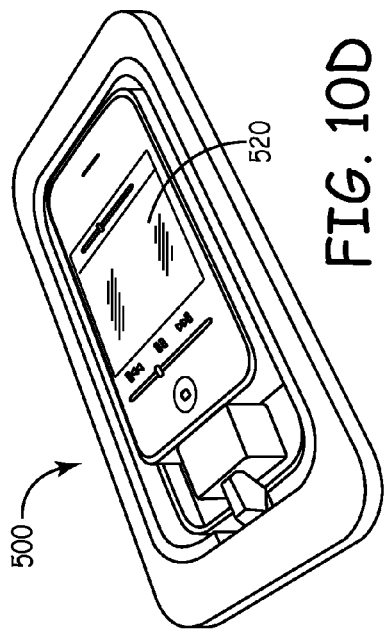
Figure 10C:
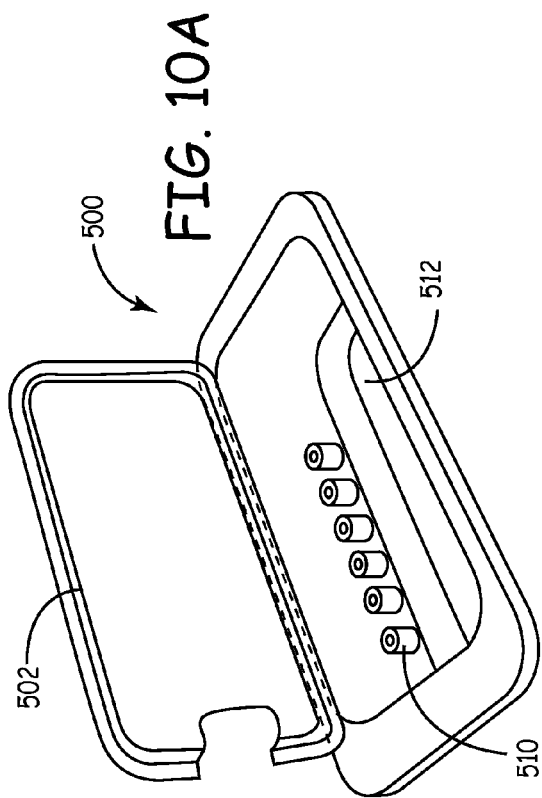
Figure 10D:
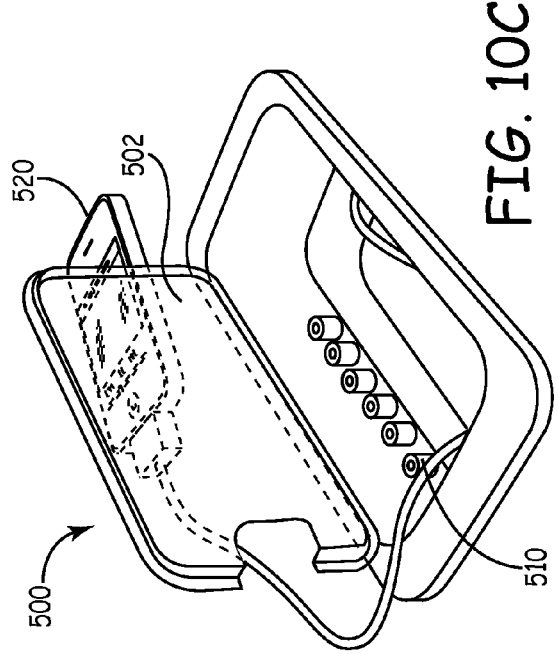

FIG. 9 depicts an alternative configuration of a top housing section of a docking assembly 350, for supporting portable electronic device 400 in a portrait or landscape mode. The top housing section of docking assembly 350 includes essentially the same components as the top housing section of docking assembly 300, but adds an auxiliary input jack 360. The input jack 360 can be located anywhere on docking assembly 350 where there is room.

FIGS. 10A-10D illustrate a docking station 500 according to another embodiment. The docking station 500 can be mounted in a drink cup rail, an arm rest surface, or the like, around the seat of a vehicle or crew station. The docking station 500 has a support cover 502 for supporting a personal portable electronic device 520 in a horizontal position. The support cover 502 can be opened for access to a plurality of jacks 510 inside a connector compartment 512 below support cover 502. The jacks 510 provide connectivity to component video, composite video, HDMI, headphone, auxiliary input, USB, and the like. A cavity below connector compartment 512, and/or an external box, can be used to house support circuitry. A universal power supply connection (e.g., 12 VDC car power adapter) can also be provided in docking station 500.

Figure 11B:
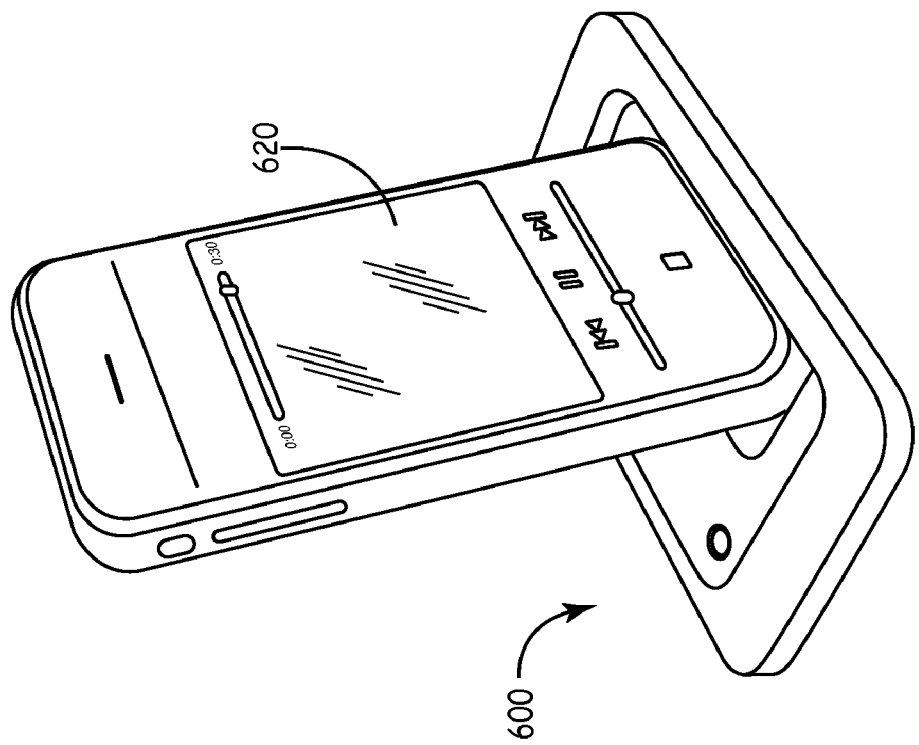
FIGS. 11A and 11B show elevated perspective views of a docking station according to another embodiment of the invention.
Figure 11A:
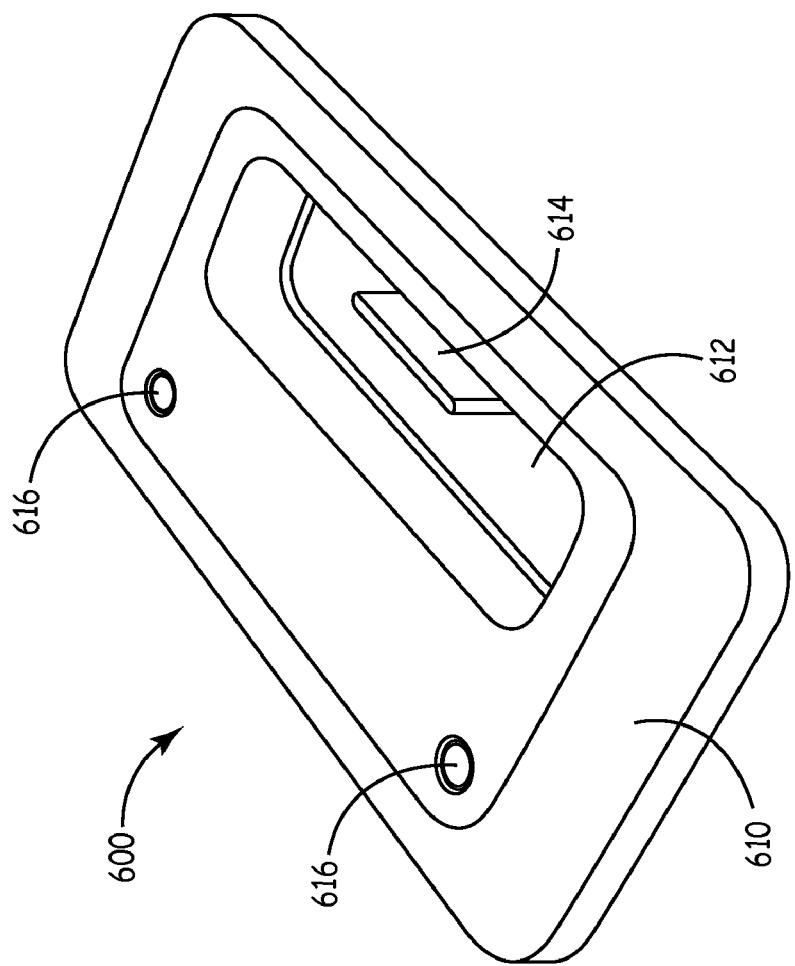

FIGS. 11A and 11B show a docking station 600 according to a further embodiment for supporting a personal portable electronic device 620 in an upright position. The docking station 600 can be configured to be part of a drink rail or armrest for an aircraft seat. The docking station 600 has an upper surface 610 with an elongated slot 612. The slot 612 has a connector 614 for coupling to portable electronic device 620. One or more input jacks 616 can also be provided on upper surface 610 to provide connectivity for portable electronic device 620.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A docking station apparatus for interfacing a portable electronic device with one or more electrical systems of an aircraft, the apparatus comprising:
    a docking assembly having an internal cavity and configured to hold the portable electronic device, the docking assembly configured to be installed adjacent to a seat in the aircraft;
    a mechanical interface in the cavity of the docking assembly and configured to provide a wired or wireless connection to the portable electronic device;
    a power supply conversion circuit for translating aircraft power levels to portable electronic device power levels; and
    one or more support circuits or connectors that provide different connectivity functions for the portable electronic device, the support circuits or connectors comprising:
        input audio/video connectors in the docking assembly to provide analog audio/video signals to an analog distribution hub;
        an audio/video encoder and digital data connectors to provide digitally encoded audio/video signals in a wired or wireless mode to a digital distribution hub;
        multiplexing circuitry to accept analog audio, composite video, or component video for multiplexing between externally supplied audio/video and locally generated audio/video; and
        a command and control circuit to provide command and control data, and aircraft navigation data, to the portable electronic device in a wired or wireless mode,
    wherein the docking assembly is configured to be placed in a cup holder and comprises:
        a top housing section having an upper surface with an elongated slot, and a rear portion;
        a bottom housing section coupled to the top housing section and having a substantially cylindrical shape;
        a back portion that extends upwardly from the upper surface of the top housing section and configured to support the portable electronic device in an upwardly angled position;
        one or more media connectors located in the rear portion of the top housing section; and
        a lip portion on the upper surface in front of and adjacent to the slot, the lip portion configured to support the portable electronic device in a landscape mode position.

2. The apparatus of claim 1, wherein the one or more support circuits or connectors are housed in the internal cavity of the docking assembly.

3. The apparatus of claim 1, wherein the one or more support circuits or connectors are housed in an external support box for the docking assembly.

4. The apparatus of claim 1, wherein the one or more support circuits or connectors comprise component or composite video connectors, stereo and surround connectors, a high-definition multimedia interface, a headphone jack, an auxiliary input jack, a USB port, optical fiber connectors, or a Bluetooth wireless interface.

5. The apparatus of claim 1, wherein the docking assembly is communicatively connected with an in-flight entertainment (IFE) system to transport signals between the IFE system and the portable electronic device.

6. The apparatus of claim 1, wherein aircraft power is supplied directly or via integrated wiring from an aircraft power source to the power supply conversion circuit.

7. A docking station assembly comprising:
    a top housing section having an upper surface with an elongated slot, and a rear portion;
    at least one support member located on the upper surface adjacent to the slot, the at least one support member configured to support a portable electronic device in a landscape mode position;
    a bottom housing section coupled to the top housing section and having a substantially cylindrical shape, wherein the coupled top and bottom housing sections define an internal cavity;
    a plug section attached to an underside of the bottom housing section;
    a back portion that extends upwardly from the upper surface adjacent to the slot and configured to support the portable electronic device in an upwardly angled position;
    an electronic device connector disposed in the slot and configured to couple with the portable electronic device;
    one or more media connectors located in the rear portion of the top housing section; and
    a mechanical interface located in the internal cavity, the mechanical interface configured to provide a wired or wireless connection to the portable electronic device, docking station rotation, and portrait or landscape modes for the portable electronic device.

8. The assembly of claim 7, wherein the media connectors communicate with the portable electronic device through a data connector located in the top housing section.

9. The assembly of claim 7, wherein the mechanical interface comprises a printed circuit board.

10. The assembly of claim 7, further comprising a power connector disposed in the internal cavity below the mechanical interface, the power connector coupled to the electronic device connector at one end and having a power coupler at the other end that extends into the plug section.

11. The assembly of claim 10, further comprising a holding device that includes an upper holding receptacle that receives the bottom housing section, and a lower power receptacle that receives the plug section.

12. The assembly of claim 11, further comprising a power supply coupler that extends into the power receptacle and mates with the power coupler.

13. A docking station apparatus for interfacing a portable electronic device with one or more electrical systems of an aircraft, the apparatus comprising:
    a docking assembly having an internal cavity and configured to hold the portable electronic device, the docking assembly configured to be installed adjacent to a seat in the aircraft;
    a mechanical interface in the cavity of the docking assembly and configured to provide a wired or wireless connection to the portable electronic device;
    a power supply conversion circuit for translating aircraft power levels to portable electronic device power levels; and one or more support circuits or connectors that provide different connectivity functions for the portable electronic device, the support circuits or connectors comprising:
- input audio/video connectors in the docking assembly to provide analog audio/video signals to an analog distribution hub;
- an audio/video encoder and digital data connectors to provide digitally encoded audio/video signals in a wired or wireless mode to a digital distribution hub;
- multiplexing circuitry to accept analog audio, composite video, or component video for multiplexing between externally supplied audio/video and locally generated audio/video; and
- a command and control circuit to provide command and control data, and aircraft navigation data, to the portable electronic device in a wired or wireless mode, wherein the docking assembly is configured to be placed in a cup holder and comprises:
- a base section having an upper surface with an elongated slot, and a rear portion;
- a back portion that extends upwardly from the upper surface of the base section and configured to support the portable electronic device in an upwardly angled position;
- one or more media connectors located in the rear portion of the base section; and
- a pair of opposing support tabs on the upper surface of the base section adjacent to the slot, the support tabs configured to support the portable electronic device in a landscape mode position.

14. The apparatus of claim 13, further comprising at least one input jack in the upper surface of the base section.

15. A docking station apparatus for interfacing a portable electronic device with one or more electrical systems of an aircraft, the apparatus comprising:
- a docking assembly having an internal cavity and configured to hold the portable electronic device, the docking assembly configured to be installed adjacent to a seat in the aircraft;
- a mechanical interface in the cavity of the docking assembly and configured to provide a wired or wireless connection to the portable electronic device;
- a power supply conversion circuit for translating aircraft power levels to portable electronic device power levels; and
- one or more support circuits or connectors that provide different connectivity functions for the portable electronic device, the support circuits or connectors comprising:
  - input audio/video connectors in the docking assembly to provide analog audio/video signals to an analog distribution hub;
  - an audio/video encoder and digital data connectors to provide digitally encoded audio/video signals in a wired or wireless mode to a digital distribution hub;
  - multiplexing circuitry to accept analog audio, composite video, or component video for multiplexing between externally supplied audio/video and locally generated audio/video; and
  - a command and control circuit to provide command and control data, and aircraft navigation data, to the portable electronic device in a wired or wireless mode, wherein:
- the docking assembly is mounted in a drink cup rail around a seat in an aircraft or an arm rest surface around a seat in an aircraft, and
- the docking station comprises:
  - a movable cover with a top surface for supporting the portable electronic device in a horizontal position; and
  - a connector compartment below the cover and housing an electronic device connector and one or more media jacks.

\* \* \* \* \*